United States Patent
Sheng

(10) Patent No.: US 7,327,502 B2
(45) Date of Patent: Feb. 5, 2008

(54) SHEET-FED SCANNING DEVICE CAPABLE OF DETECTING A DOCUMENT EDGE

(75) Inventor: Thomas Sheng, Hsinchu (TW)

(73) Assignee: Avision Inc. (TW)

( * ) Notice: Subject to any disclaimer, the term of this patent is extended or adjusted under 35 U.S.C. 154(b) by 878 days.

(21) Appl. No.: 10/801,583

(22) Filed: Mar. 17, 2004

(65) Prior Publication Data

US 2005/0141055 A1    Jun. 30, 2005

(30) Foreign Application Priority Data

Dec. 26, 2003    (TW) ............................. 92137098 A

(51) Int. Cl.
*H04N 1/04*   (2006.01)
(52) U.S. Cl. ............... 358/498; 358/496; 358/486; 358/488
(58) Field of Classification Search ............ 358/496, 358/498, 488, 486, 474; 399/367, 364, 374; 355/23; 382/318, 319; 250/559.42; 271/3.15, 271/3.16, 3.18

See application file for complete search history.

(56) References Cited

U.S. PATENT DOCUMENTS

| 5,139,339 | A |  | 8/1992 | Courtney et al. |
| 5,169,140 | A |  | 12/1992 | Wenthe, Jr. |
| 6,166,394 | A | * | 12/2000 | Rubscha ............... 250/559.42 |
| 6,741,741 | B2 | * | 5/2004 | Farrell ...................... 382/199 |
| 6,839,155 | B2 | * | 1/2005 | Spencer .................... 358/488 |

* cited by examiner

*Primary Examiner*—Cheukfan Lee

(57) ABSTRACT

A sheet-fed scanning device capable of detecting a document edge includes a scanning module and an automatic document feeder. The scanning module scans a document with a light ray. The automatic document feeder feeds the document across a scanning region on a sheet passageway for the scanning module to scan. In this invention, a section of a guide plate of the sheet passageway located within the scanning region is formed with a concave portion, wherein the document moving across the scanning region is located between the concave portion and the scanning module, such that the intensity of a first brightness of the concave portion sensed by the scanning module is far smaller than the intensity of a second brightness of the document sensed by the scanning module. Thus, it is possible to facilitate the document edge detection and the document skew correction.

20 Claims, 7 Drawing Sheets

SHEET-FED SCANNING DEVICE CAPABLE OF DETECTING A DOCUMENT EDGE

This Nonprovisional application claims priority under 35 U.S.C. § 119(a) on Patent Application No(s). 092137098 filed in TAIWAN on Dec. 26, 2003, the entire contents of which are hereby incorporated by reference.

BACKGROUND OF THE INVENTION

1. Field of the Invention

The invention relates to a sheet-fed scanning device capable of detecting a document edge, and more particularly to a sheet-fed scanning device utilizing a dark background which does not contact the document to facilitate the detection of the document edge.

2. Description of the Related Art

In a sheet-fed scanner, the conventional document edge detecting method includes detecting a leading edge of a document in order to inform the scanner when to start outputting the acquired image signal of the document. A method for detecting the leading edge of the document may be performed by utilizing a paper sensor in conjunction with the design parameters of the sheet-feeding structure. This method, however, may cause corresponding mechanical errors. Another method for detecting the leading edge of the document may be performed by utilizing a dark background behind the document. In this detection method, the document edge is assumed to be white, so the dark background may serve as a comparison reference. The leading edge detection may be achieved by way of image processing.

After the document leading edge has been detected, it is possible to judge whether or not the segments at two ends of the leading edge of the document reach the scanning region simultaneously by way of image processing, and the skew correction of the document may be performed accordingly.

FIG. 1 is a schematic illustration showing a conventional device for detecting a leading edge of a document. As shown in FIG. 1, a document 102 moving across a scan window 105 is scanned by a scanning module 104 under the scan window 105. A background component 101 is positioned above the document 102 and in contact with the document 102 to thereby provide a black background to facilitate the detection of a leading edge 103 of the document and the subsequent skew correction.

Under the long-term usage, the background component 101 may be correspondingly worn out and then lose its smooth surface. In result, the fed document may be scratched and the scan quality may be influenced owing to the impact of the increasing frictional force between the document and the background component 101 on the speed of the document moving across the scanning region. In addition, the background component 101 also may attract a lot of paper flakes due to the electrostatic charges. If the paper flakes are white, the background component 101 cannot provide the black background and so loses its function. Thus, the detection of the document leading edge and the skew correction may be further influenced.

Consequently, it is an important subject of the invention to provide a sheet-fed scanning device, which is capable of detecting a document edge, suitable for the long-term usage, and free from the worn-out problem.

SUMMARY OF THE INVENTION

It is therefore an object of the invention to provide a sheet-fed scanning device utilizing a dark background which does not contact the document to facilitate the document edge detection and to avoid the errors caused by the wear of the background.

The invention achieves the above-identified object by providing a sheet-fed scanning device capable of detecting a document edge. The sheet-fed scanning device includes a scanning module and an automatic document feeder. The scanning module scans a document with a light ray. The automatic document feeder feeds the document across a scanning region on a sheet passageway and therefore, the scanning module may scan the document in the scanning region. In this invention, a section of a guide plate of the sheet passageway located within the scanning region is formed with a concave portion, wherein the document moving across the scanning region is located between the concave portion and the scanning module, such that the intensity of a first brightness of the concave portion sensed by the scanning module is far smaller than the intensity of a second brightness of the document sensed by the scanning module. Thus, it is possible to facilitate the document edge detection and the document skew correction.

DETAILED DESCRIPTION OF THE INVENTION

Figure 1:
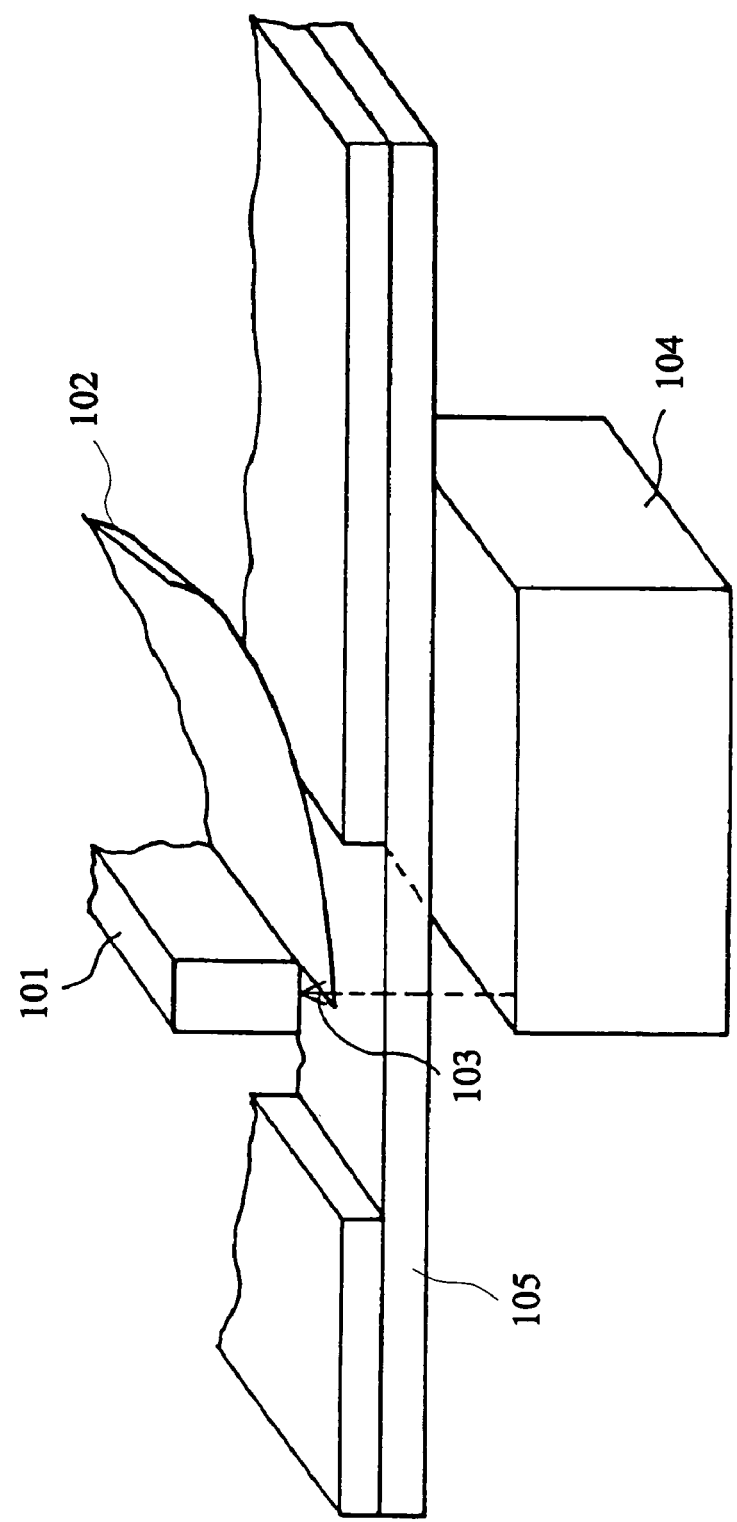
FIG. 1 is a schematic illustration showing a conventional device for detecting a leading edge of a document.
Figure 2:
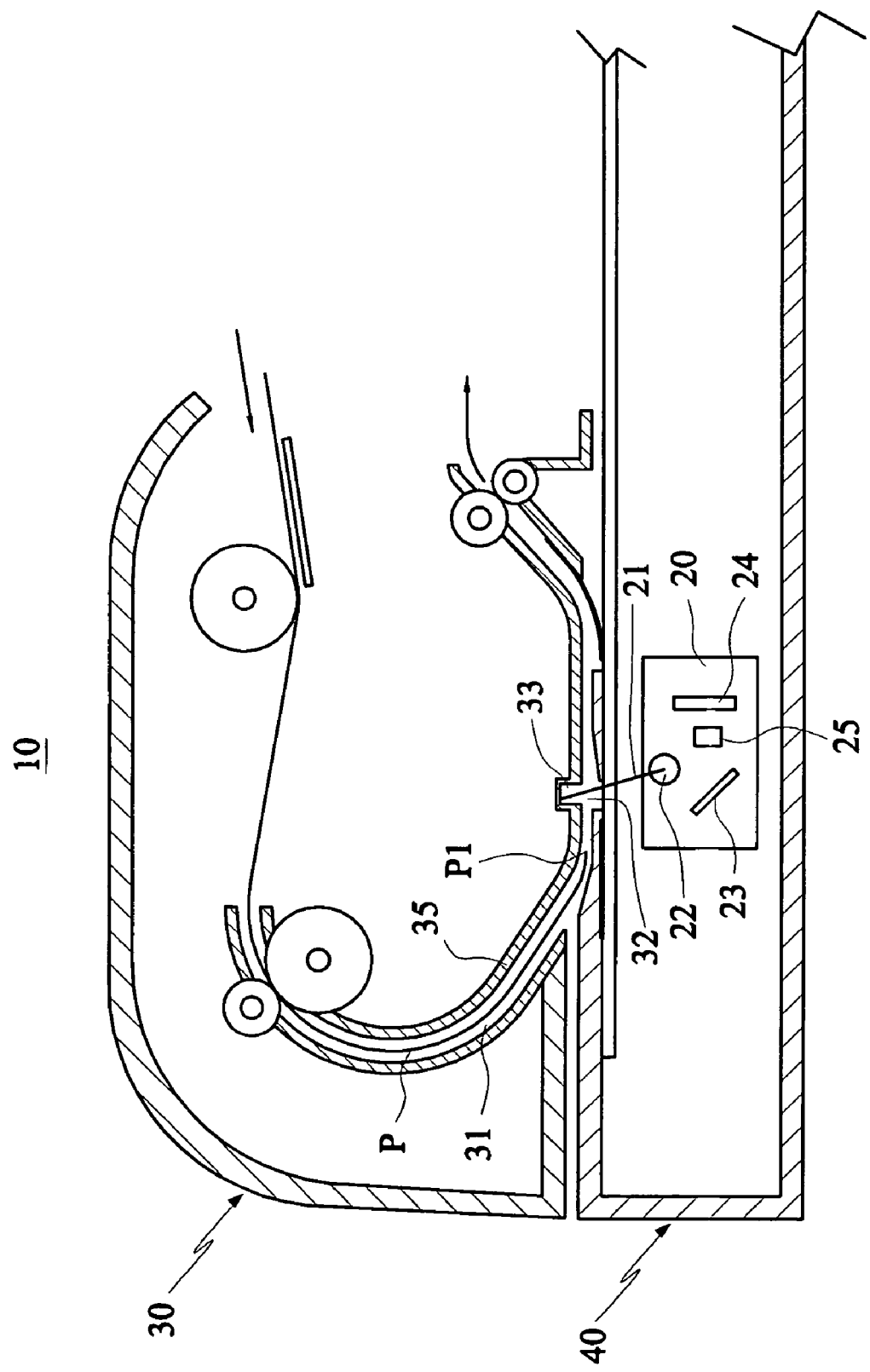
FIG. 2 is a schematic illustration showing a sheet-fed scanning device capable of detecting a document edge according to a first embodiment of the invention.
Figure 3:
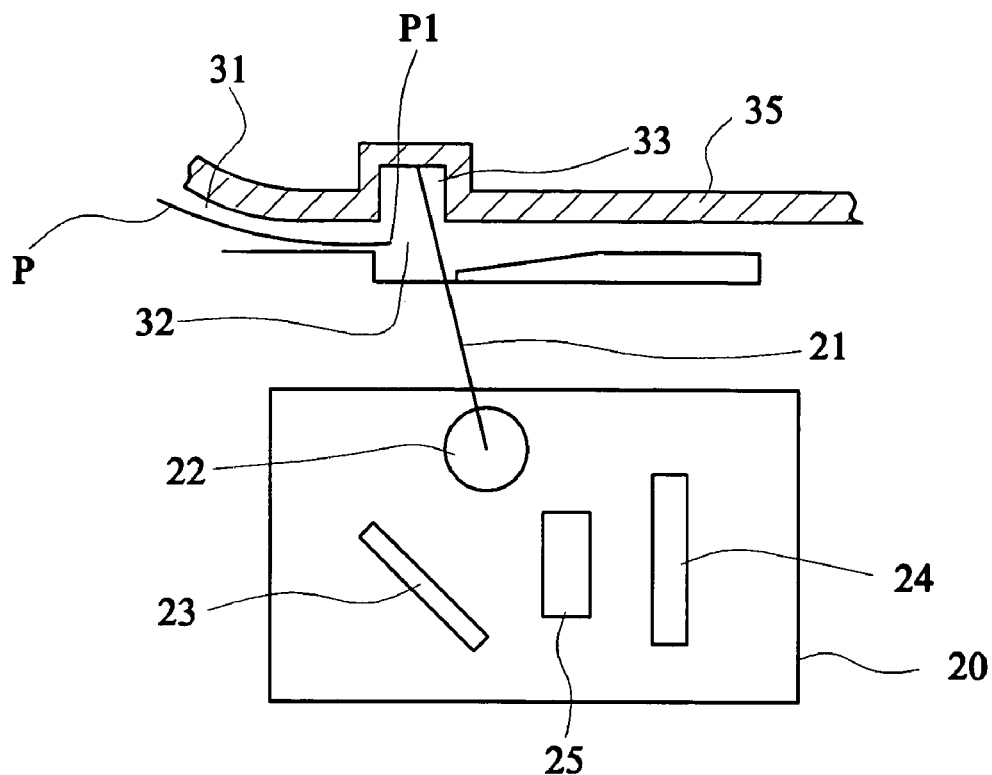
FIG. 3 is a partially schematic illustration showing a first state of the sheet-fed scanning device of FIG. 2.
Figure 4:
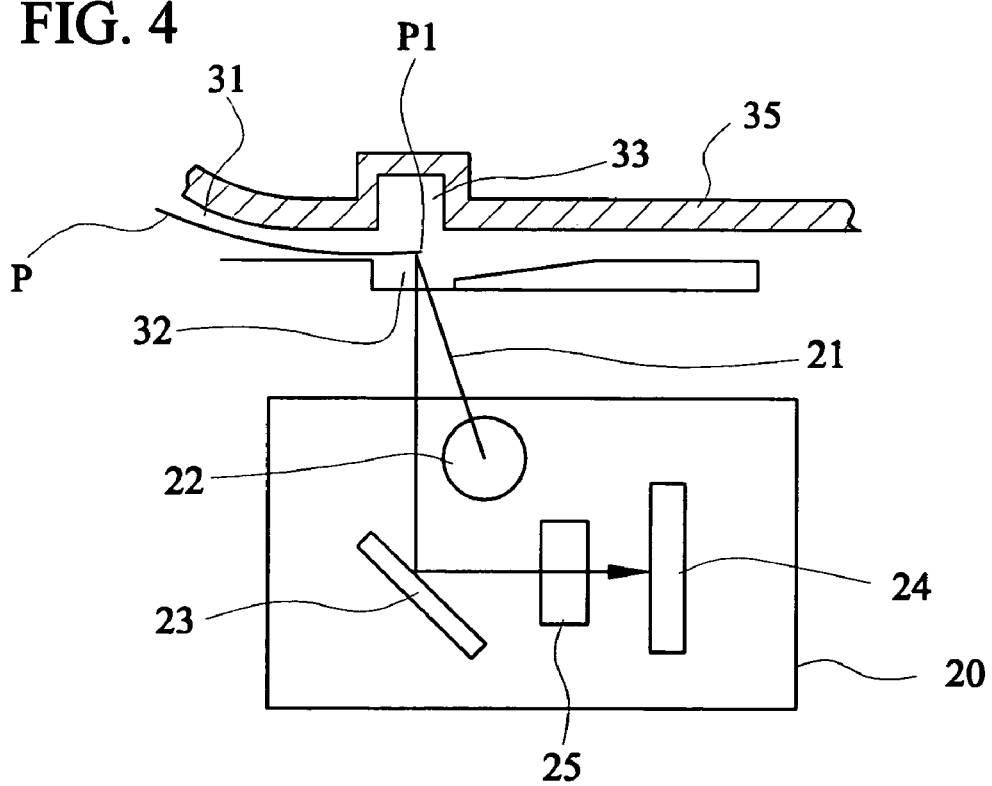
FIG. 4 is a partially schematic illustration showing a second state of the sheet-fed scanning device of FIG. 2.

FIG. 2 is a schematic illustration showing a sheet-fed scanning device capable of detecting a document edge according to a first embodiment of the invention. FIGS. 3 and 4 are partially schematic illustrations showing a first state and a second state of the sheet-fed scanning device of FIG. 2. Referring to FIGS. 2 to 4, a sheet-fed scanning device 10 capable of detecting a document edge of the invention includes a scanning module 20, an automatic document feeder 30, and a housing 40. In addition to the sheet-fed scan function, the sheet-fed scanning device 10 also has a flatbed scan function. The scanning module 20 has a light source 22, a reflecting mirror set 23, an image sensor 24, and a lens set 25. The light source 22 outputs a light ray 21 to scan a document P. The reflecting mirror set 23 may include one or more reflecting mirrors. The automatic document feeder 30 feeds the document P across a scanning region 32 on a sheet passageway 31 for the scanning module 20 to scan. A section of a guide plate 35 of the sheet passageway 31 located within the scanning region 32 is formed with a concave portion 33. The concave portion 33 is formed on the guide plate 35 of the sheet passageway 31, and the document P moving across the scanning region 32 is located between the concave portion 33 and the scanning module 20. Because the concave portion 33 cannot reflect the light ray, which is reflected by the reflecting mirror set 23 and passes through the lens set 25, back to the image sensor 24, the intensity of a first brightness of the concave portion 33 sensed by the scanning module 20 is far smaller than the intensity of a second brightness of the document P sensed by the scanning module 20. A comparison between the intensity of the second brightness and the intensity of the first brightness will facilitate the determination of the actual detection of an edge P1 of the document P. Herein, the edge P1 of the document is a leading edge. Skewness of the document is calculated according to the detection of the difference between two segments at two ends of the leading edge of the document.

Figure 5:
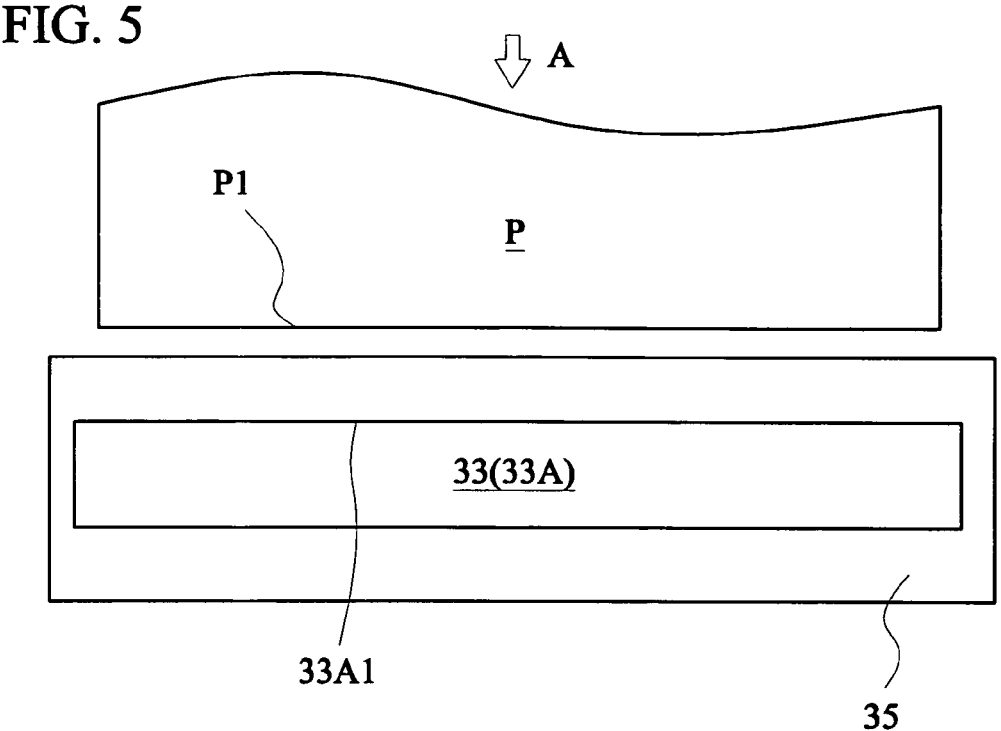
FIG. 5 shows an example of a concave portion of the sheet-fed scanning device of FIG. 2.

FIG. 5 shows an example of a concave portion of the sheet-fed scanning device of FIG. 2. Referring to FIG. 5, the concave portion 33 includes a long slot 33A, which may or may not penetrate through the guide plate 35 of the sheet passageway 31. The long slot 33A has a longitudinal side 33A1 substantially perpendicular to a feeding direction A of the document P.

Figure 6:
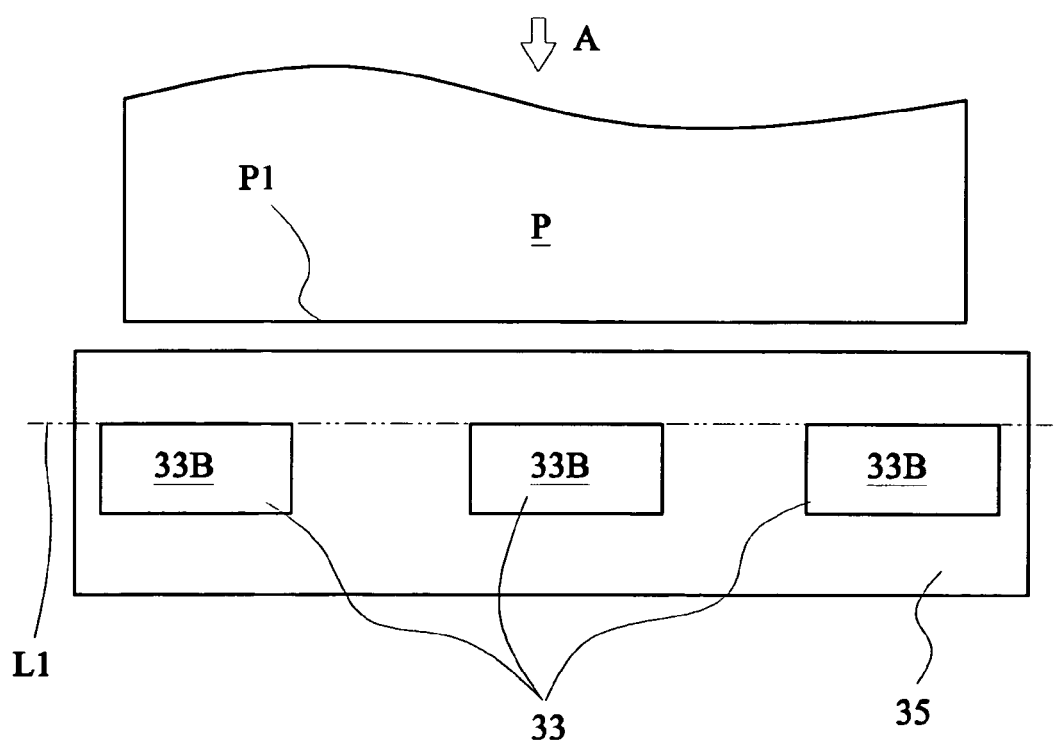
FIG. 6 shows another example of the concave portion of the sheet-fed scanning device of FIG. 2.

FIG. 6 shows another example of the concave portion of the sheet-fed scanning device of FIG. 2. As shown in FIG. 6, the concave portion 33 includes a plurality of long slots 33B, which may or may not penetrate through the guide plate 35. The long slots 33B are arranged in a straight line L1, which is substantially perpendicular to the feeding direction A of the document P.

Figure 7:
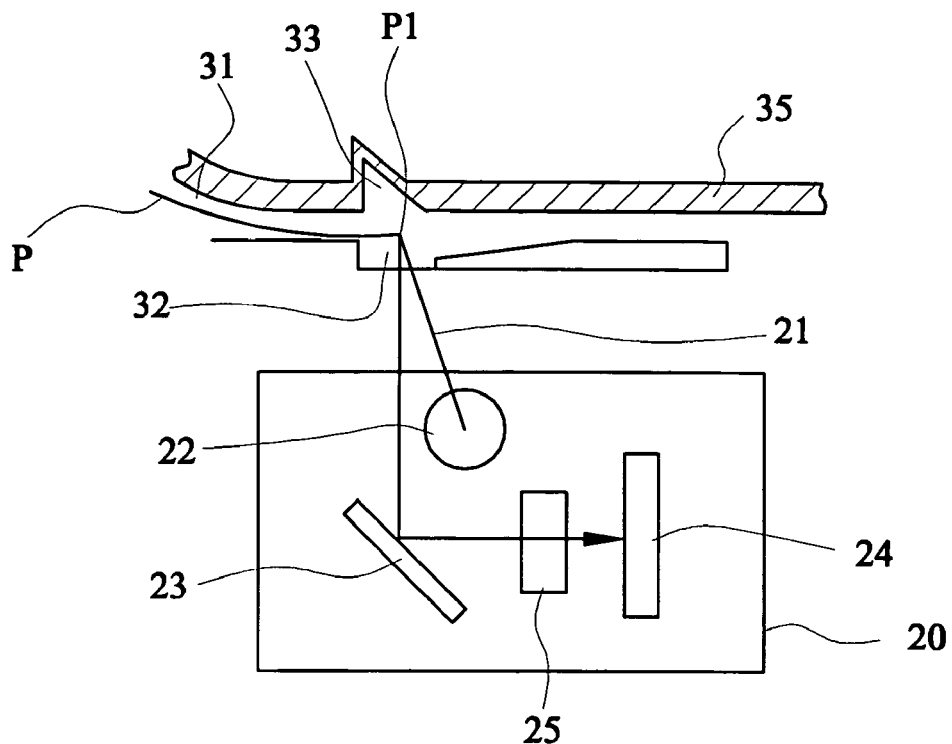
FIG. 7 is a partially schematic illustration showing a second state of a sheet-fed scanning device according to a second embodiment of the invention.

FIG. 7 is a partially schematic illustration showing a second state of a sheet-fed scanning device according to a second embodiment of the invention. As shown in FIG. 7, unlike the inverse-U shaped concave portion 33 of FIG. 2, the concave portion 33 of this embodiment may be an inverse-V shape.

Figure 8:
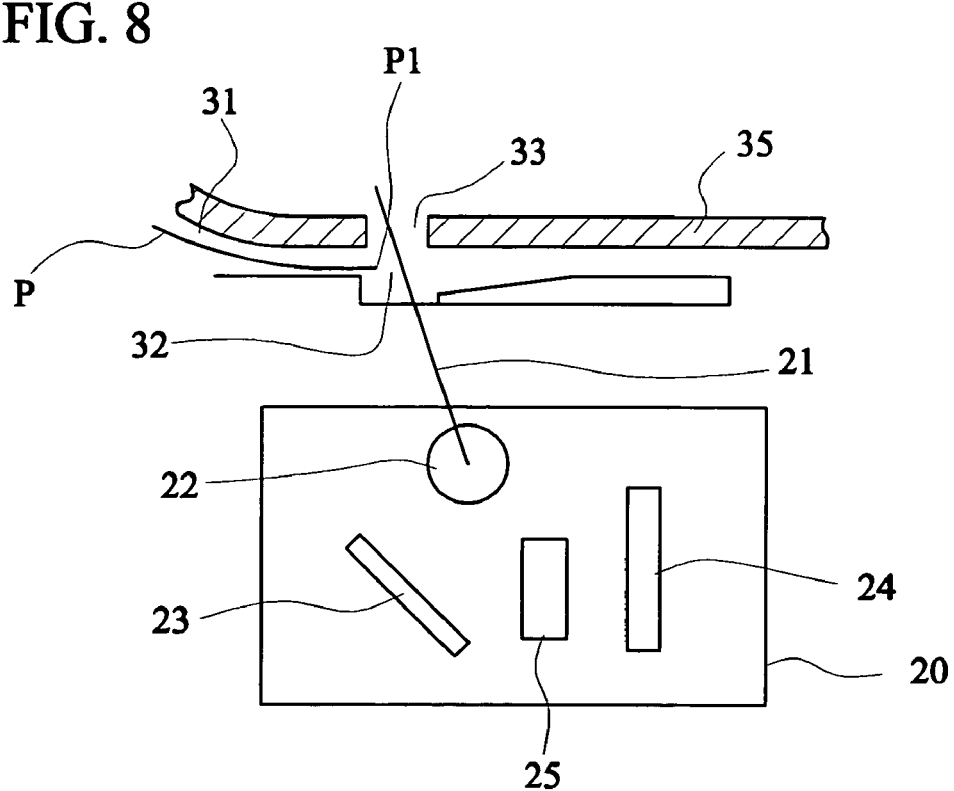
FIG. 8 is a partially schematic illustration showing a first state of a sheet-fed scanning device according to a third embodiment of the invention.

FIG. 8 is a partially schematic illustration showing a first state of a sheet-fed scanning device according to a third embodiment of the invention. As shown in FIG. 8, unlike the concave portion 33 of FIG. 2, which does not penetrate through the guide plate 35, the concave portion 33 of this embodiment may penetrate through the guide plate 35 such that the light ray 21 cannot be reflected back to the image sensor 24 of the scanning module 20.

Figure 9:
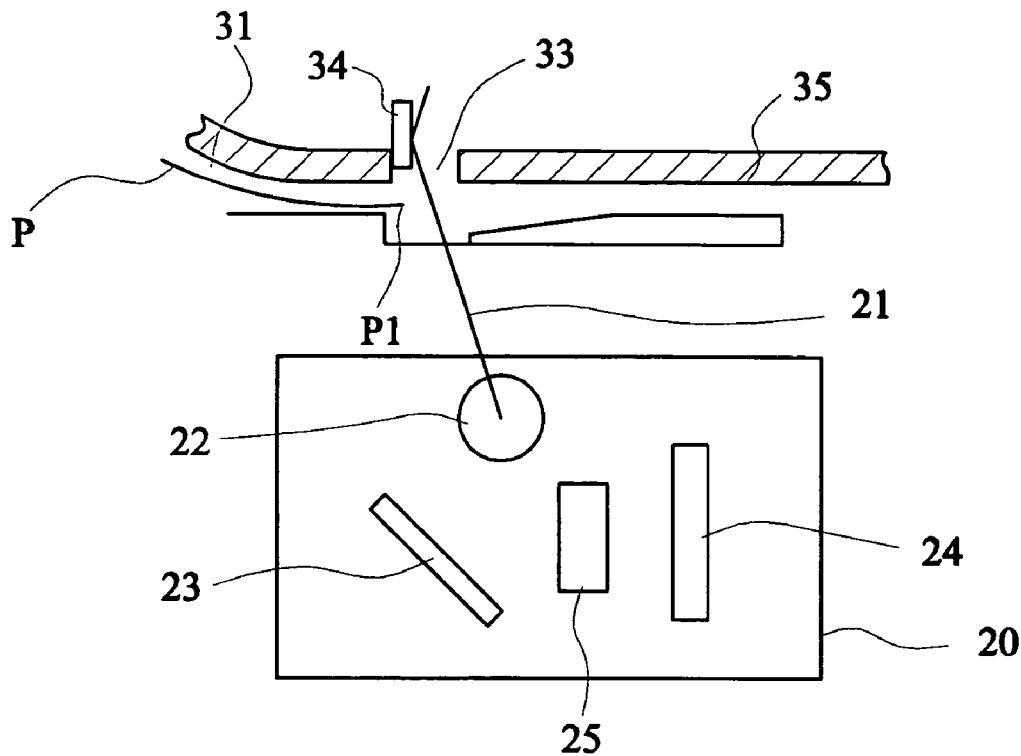
FIG. 9 is a partially schematic illustration showing a first state of a sheet-fed scanning device according to a fourth embodiment of the invention.

FIG. 9 is a partially schematic illustration showing a first state of a sheet-fed scanning device according to a fourth embodiment of the invention. Referring to FIG. 9, the sheet-fed scanning device of this embodiment further includes a reflecting mirror 34 installed in the concave portion 33. According to the principle of the incident angle equal to the angle of reflection, the light ray 21 is reflected away from the image sensor 24 of the scanning module 20, and no other light rays will be reflected back to the image sensor 24. The reflecting mirror 34 may be slantingly installed. In this case, the light ray reflected by the reflecting mirror 34 also cannot be sensed by the image sensor 24. The reflecting mirror 34 may also be replaced by a reflective layer with a high reflectivity. Alternatively, the reflecting mirror 34 also may be replaced by a light-absorbing layer with a high light-absorption coefficient, and the light-absorbing layer is also installed in the concave portion so as to absorb the light ray. The reflecting mirror, reflective layer and light-absorbing layer may be completely or partially located in the concave portion.

Figure 10:
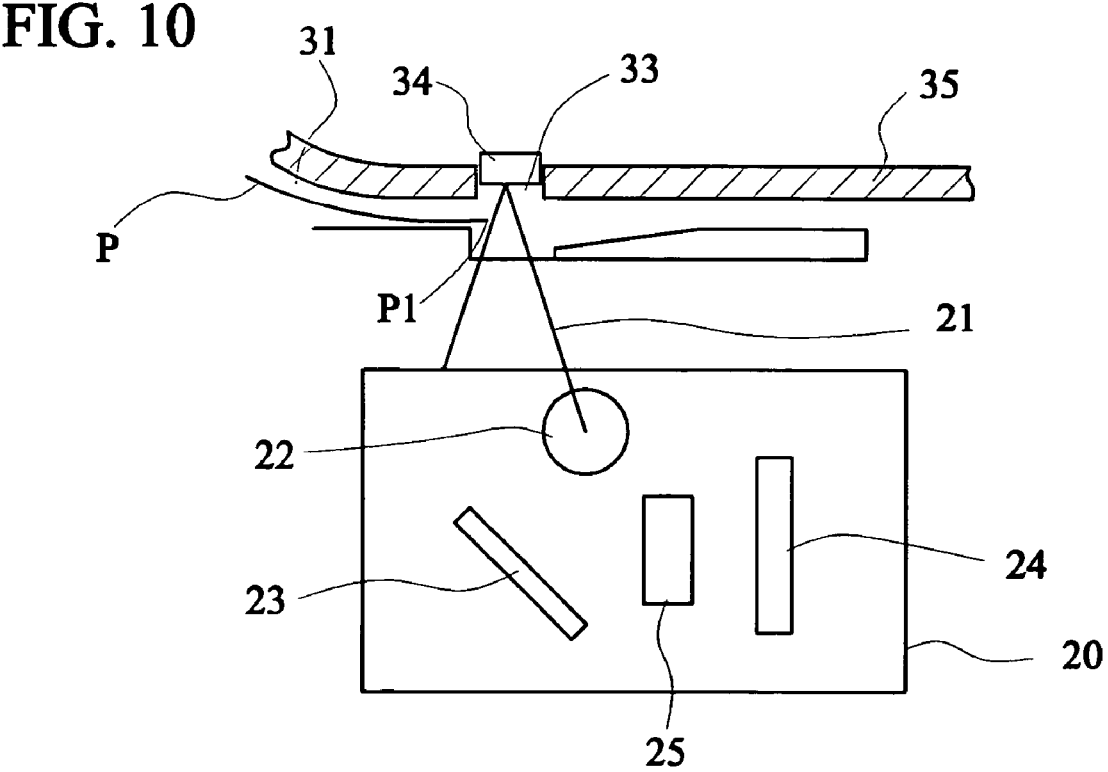
FIG. 10 is a partially schematic illustration showing a first state of a sheet-fed scanning device according to a fifth embodiment of the invention.

FIG. 10 is a partially schematic illustration showing a first state of a sheet-fed scanning device according to a fifth embodiment of the invention. In this embodiment, the reflecting mirror 34 is horizontally installed, which also makes the image sensor 24 sense no light ray in this state. In addition, there is no contact and friction between the reflecting mirror 34 and the document P, and the problem of the reflecting mirror 34 attracting the paper flakes can be effectively avoided.

Figure 11:
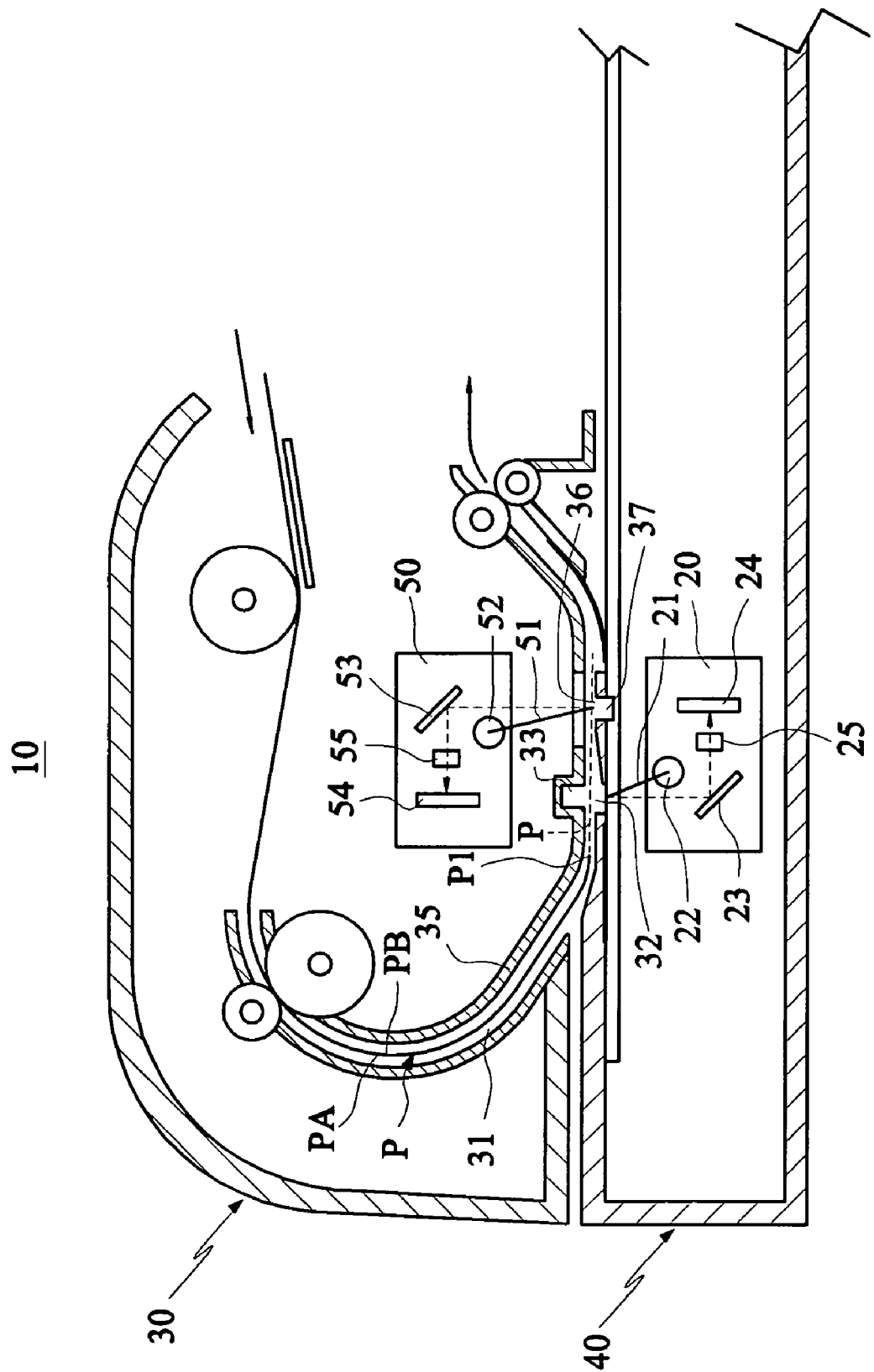
FIG. 11 is a schematic illustration showing a sheet-fed scanning device according to a sixth embodiment of the invention.

FIG. 11 is a schematic illustration showing a sheet-fed scanning device according to a sixth embodiment of the invention. Referring to FIG. 11, the sheet-fed scanning device 10 of this embodiment includes a housing 40, a first scanning module 20, a second scanning module 50 and an automatic document feeder 30. The light source 22 of the first scanning module 20 outputs a first light ray 21 to scan a front side PA of a document P, and a front side image may be obtained with the aid of the reflecting mirror set 23, the lens set 25 and the image sensor 24. The first scanning module 20 is contained in the housing 40. The light source 52 of the second scanning module 50 outputs a second light ray 51 to scan a back side PB of the document P, and a back side image may be obtained with the aid of the reflecting mirror set 53, the lens set 55 and the image sensor 54. The automatic document feeder 30 feeds the document P across a first scanning region 32 and a second scanning region 36 on a sheet passageway 31 for the first and second scanning modules 20 and 50 to scan.

In this embodiment, a section of the guide plate 35 of the sheet passageway 31 located within the first scanning region 32 is formed with a first concave portion 33, and the document P moving across the first scanning region 32 is located between the first concave portion 33 and the first scanning module 20. Hence, the intensity of a first brightness of the first concave portion 33 sensed by the first scanning module 20 is different from the intensity of a second brightness of the document P sensed by the first scanning module 20 in order to facilitate the detection of an edge P1 of the document P. In addition, a section of the sheet passageway 31 located within the second scanning region 36 is formed with a second concave portion 37. The document P moving across the second scanning region 36 is located between the second concave portion 37 and the second scanning module 50. Hence, the intensity of a third brightness of the second concave portion 37 sensed by the second scanning module 50 is different from the intensity of a fourth brightness of the document P sensed by the second scanning module 50 in order to facilitate the detection of the edge P1 of the document P.

The second concave portion 37 of this embodiment and the first concave portion 33 have similar functions, so the second concave portion 37 may have the structure similar to that of the first concave portion 33, such as the associated structures as depicted in FIGS. 5 to 10. For example, the skewness of the front side and the back side of the document may be calculated according to the detected document edge. In addition, the second concave portion may also have a long slot, which has a longitudinal side substantially perpendicular to the feeding direction of the document. Furthermore, the long slot may penetrate through the housing 40. Also, the second concave portion may have several long slots, which are arranged in one straight line and may penetrate through the housing, wherein the straight line is substantially perpendicular to the feeding direction of the document. A reflecting mirror, a reflective layer or a light-absorbing layer also may be installed in the second concave portion to prevent the second light ray from reaching the image sensor of the second scanning module.

According to the structures of the invention, the same effects as those of the prior art may be achieved without the need of the background component. The effects may be, for example, the detection of the document edges and the provision of a scan background of a different color from that of the document. Thus, the leading edge, side edge, and trailing edge of the document may be detected. Even the previewed image may be processed: for example, the scan region of the previewed image may be cropped automatically. Other issues such as the manufacturing of the concave portion can be easily solved. For example, the concave portion can be manufactured by way of plastic injection molding in a mass production manner, which is advantageous to the reduction of the cost. In result, the number of components of the scanning device of the invention may be reduced by one as compared to the conventional scanning device, and the component and assembly cost may be reduced. Furthermore, because the dark background of the invention does not contact the document, the wearing of the document moving across the scanning region may be reduced, and the scan process may be smoother.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A sheet-fed scanning device capable of detecting a document edge, the sheet-fed scanning device comprising:
   a scanning module for scanning a document with a light ray; and
   an automatic document feeder for feeding the document across a scanning region on a sheet passageway for the scanning module to scan, wherein a section of a guide plate of the sheet passageway located within the scanning region is formed with a concave portion, and the document moving across the scanning region is located between the concave portion and the scanning module, such that the intensity of a first brightness of the concave portion sensed by the scanning module is different from the intensity of a second brightness of the document sensed by the scanning module, to facilitate the detection of the document edge.

2. The sheet-fed scanning device according to claim 1, wherein skewness of the document is calculated according to the detected document edge.

3. The sheet-fed scanning device according to claim 1, wherein the concave portion comprises a long slot having a longitudinal side substantially perpendicular to a feeding direction of the document.

4. The sheet-fed scanning device according to claim 3, wherein the long slot penetrates through the guide plate of the sheet passageway.

5. The sheet-fed scanning device according to claim 3, wherein the long slot does not penetrate through the guide plate of the sheet passageway.

6. The sheet-fed scanning device according to claim 1, wherein the concave portion comprises a plurality of long slots arranged in one straight line, which is substantially perpendicular to a feeding direction of the document.

7. The sheet-fed scanning device according to claim 6, wherein each of the long slots penetrates through the guide plate of the sheet passageway.

8. The sheet-fed scanning device according to claim 3, wherein each of the long slots does not penetrate through the guide plate of the sheet passageway.

9. The sheet-fed scanning device according to claim 1, further comprising:
   a reflecting mirror, which is disposed in the concave portion, for reflecting the light ray away from an image sensor of the scanning module.

10. The sheet-fed scanning device according to claim 1, further comprising:
    a reflective layer, which has a high reflectivity and is disposed in the concave portion, for reflecting the light ray away from an image sensor of the scanning module.

11. The sheet-fed scanning device according to claim 1, further comprising:
    a light-absorbing layer, which has a high light-absorption coefficient and is disposed in the concave portion, for absorbing the light ray.

12. A sheet-fed scanning device capable of detecting a document edge, the sheet-fed scanning device comprising:
    a housing;
    a first scanning module, which is contained in the housing, for scanning a front side of a document with a first light ray;
    a second scanning module for scanning a back side of the document with a second light ray; and
    an automatic document feeder for feeding the document across a first scanning region and a second scanning region on a sheet passageway for the first and second scanning modules to scan, respectively, wherein:
    a section of a guide plate of the sheet passageway located within the first scanning region is formed with a first concave portion, and the document moving across the first scanning region is located between the first concave portion and the first scanning module, such that the intensity of a first brightness of the first concave portion sensed by the first scanning module is different from the intensity of a second brightness of the document sensed by the first scanning module, to facilitate the detection of the document edge; and
    a section of the sheet passageway located within the second scanning region is formed with a second concave portion, and the document moving across the second scanning region is located between the second concave portion and the second scanning module, such that the intensity of a third brightness of the second concave portion sensed by the second scanning module is different from the intensity of a fourth brightness of the document sensed by the second scanning module, to facilitate the detection of the document edge.

13. The sheet-fed scanning device according to claim 12, wherein skewness of the document is calculated according to the detected document edge.

14. The sheet-fed scanning device according to claim 12, wherein the second concave portion comprises a long slot having a longitudinal side substantially perpendicular to a feeding direction of the document.

15. The sheet-fed scanning device according to claim 14, wherein the long slot penetrates through the housing.

16. The sheet-fed scanning device according to claim 12, wherein the second concave portion comprises a plurality of long slots arranged in one straight line, which is substantially perpendicular to a feeding direction of the document.

17. The sheet-fed scanning device according to claim 16, wherein the long slots penetrate through the housing.

18. The sheet-fed scanning device according to claim 12, further comprising:
   a reflecting mirror, which is disposed in the second concave portion, for reflecting the second light ray away from an image sensor of the second scanning module.

19. The sheet-fed scanning device according to claim 12, further comprising:
   a reflective layer, which has a high reflectivity and is disposed in the second concave portion, for reflecting the second light ray away from an image sensor of the second scanning module.

20. The sheet-fed scanning device according to claim 12, further comprising:
   a light-absorbing layer, which has a high light-absorption coefficient and is disposed in the second concave portion, for absorbing the second light ray.

* * * * *